(12) United States Patent
Wu et al.

(10) Patent No.: US 11,316,981 B2
(45) Date of Patent: Apr. 26, 2022

(54) STACK QUEUING CUSTOMER CARE ROUTING WITH VERTICAL METRICS

(71) Applicant: T-Mobile USA, Inc., Bellevue, WA (US)

(72) Inventors: Jeremy Wu, Bothell, WA (US); Eric Barr, Snohomish, WA (US); David Kemp, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 17 days.

(21) Appl. No.: 16/917,762

(22) Filed: Jun. 30, 2020

(65) Prior Publication Data

US 2021/0092231 A1 Mar. 25, 2021

Related U.S. Application Data

(60) Provisional application No. 62/905,298, filed on Sep. 24, 2019.

(51) Int. Cl.
*H04M 3/523* (2006.01)
*G06Q 30/00* (2012.01)
*G06Q 10/06* (2012.01)
*G06Q 20/12* (2012.01)

(52) U.S. Cl.
CPC ...... *H04M 3/5238* (2013.01); *G06Q 10/0639* (2013.01); *G06Q 10/06312* (2013.01); *G06Q 10/06315* (2013.01); *G06Q 10/063112* (2013.01); *G06Q 30/016* (2013.01); *G06Q 20/127* (2013.01); *H04M 2203/558* (2013.01)

(58) Field of Classification Search
CPC ..... G06Q 10/063112; G06Q 10/06312; G06Q 10/06315; G06Q 10/0639; G06Q 20/127; G06Q 30/016; H04M 3/51; H04M 3/523; H04M 3/5238; H04M 2203/558
USPC ........................ 379/266.01–266.06
See application file for complete search history.

(56) References Cited

U.S. PATENT DOCUMENTS

| 5,592,542 | A | * | 1/1997 | Honda | H04M 3/523 |
| | | | | | 379/265.11 |
| 6,408,066 | B1 | * | 6/2002 | Andruska | H04M 3/5233 |
| | | | | | 379/265.12 |
| 2003/0016812 | A1 | * | 1/2003 | Rodenbusch | H04M 3/5158 |
| | | | | | 379/266.05 |
| 2005/0102355 | A1 | * | 5/2005 | White | H04M 3/5232 |
| | | | | | 709/204 |

(Continued)

*Primary Examiner* — Harry S Hong
(74) *Attorney, Agent, or Firm* — Han Santos, PLLC

(57) ABSTRACT

Techniques are described herein for routing customer support requests via a vertical stack queue. The techniques may include receiving a request for customer support from a user device and identifying a group of agents available to serve the request. The group is associated with a stack queue, and the request is routed to a first level of contact queue pool that includes the group. Upon determining whether a wait time associated the stack queue at the first level of contact queue pool exceeds a predetermined threshold, an additional group of agents to serve the request is identified in addition to the group of the plurality of groups of agents. The group and an additional group of agents are distinct from each other. Upon identifying the additional group, the request is routed to a second level of contact queue pool that includes the additional group of agents.

20 Claims, 6 Drawing Sheets

(56) References Cited

U.S. PATENT DOCUMENTS

| | | | |
|---|---|---|---|
| 2005/0207559 A1* | 9/2005 | Shtivelman | H04M 3/5183 379/266.06 |
| 2009/0296919 A1* | 12/2009 | Pan | H04M 3/5235 379/266.01 |
| 2010/0119052 A1* | 5/2010 | Kambli | H04M 3/5175 379/265.02 |
| 2013/0243179 A1* | 9/2013 | Thomson | H04M 3/5175 379/265.12 |

* cited by examiner

|  | STACK QUEUE 1 208(1) | STACK QUEUE 2 208(2) | STACK QUEUE 3 208(3) | STACK QUEUE 4 208(4) |
|---|---|---|---|---|
| THIRD LEVEL OF CONTACT QUEUE POOL 214 | WAIT TIME A3 216(3) | WAIT TIME B3 218(3) | WAIT TIME C3 220(3) | WAIT TIME D3 222(3) |
| SECOND LEVEL OF CONTACT QUEUE POOL 212 | WAIT TIME A2 216(2) | WAIT TIME B2 218(2) | WAIT TIME C2 220(2) | WAIT TIME D2 222(2) |
| FIRST LEVEL OF CONTACT QUEUE POOL 210 | WAIT TIME A1 216(1) | WAIT TIME B1 218(1) | WAIT TIME C1 220(1) | WAIT TIME D1 222(1) |

FIG. 3

STACK QUEUING CUSTOMER CARE ROUTING WITH VERTICAL METRICS

BACKGROUND

Customers experiencing telecommunications and data communication service issues can initiate calls or chat sessions with contact centers that are operated by a telecommunication service provider. The performance of the contact centers can be dependent on its infrastructure and logistical efficiencies. Customers are generally connected to a contact center agent based on the nature of the service issue. The contact center agent may be a member of a group of agents that is qualified to provide support services, and the group of agents may be a part of a contact queue pool.

A contact queue pool can include multiple groups of agents. Presently, a single layer of contact queue pool is made available to customers accessing customer support services. However, as additional agents are made available to assist customers, it is difficult to distinguish groups of agent pools for providing metrics. For example, if a contact queue pool includes the first, second, and third group of agents, and a customer's call is answered by an agent in the agent pool, it is not possible to identify the agent group that answered the call. Additionally, because the agent groups are no longer distinct, the customer cannot be directed back to the group of agents that was initially in the contact queue pool.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

FIG. 3 is a table showing predetermined thresholds for wait times for each stack queue at various levels of contact queue pool.

DETAILED DESCRIPTION

Figure 1:
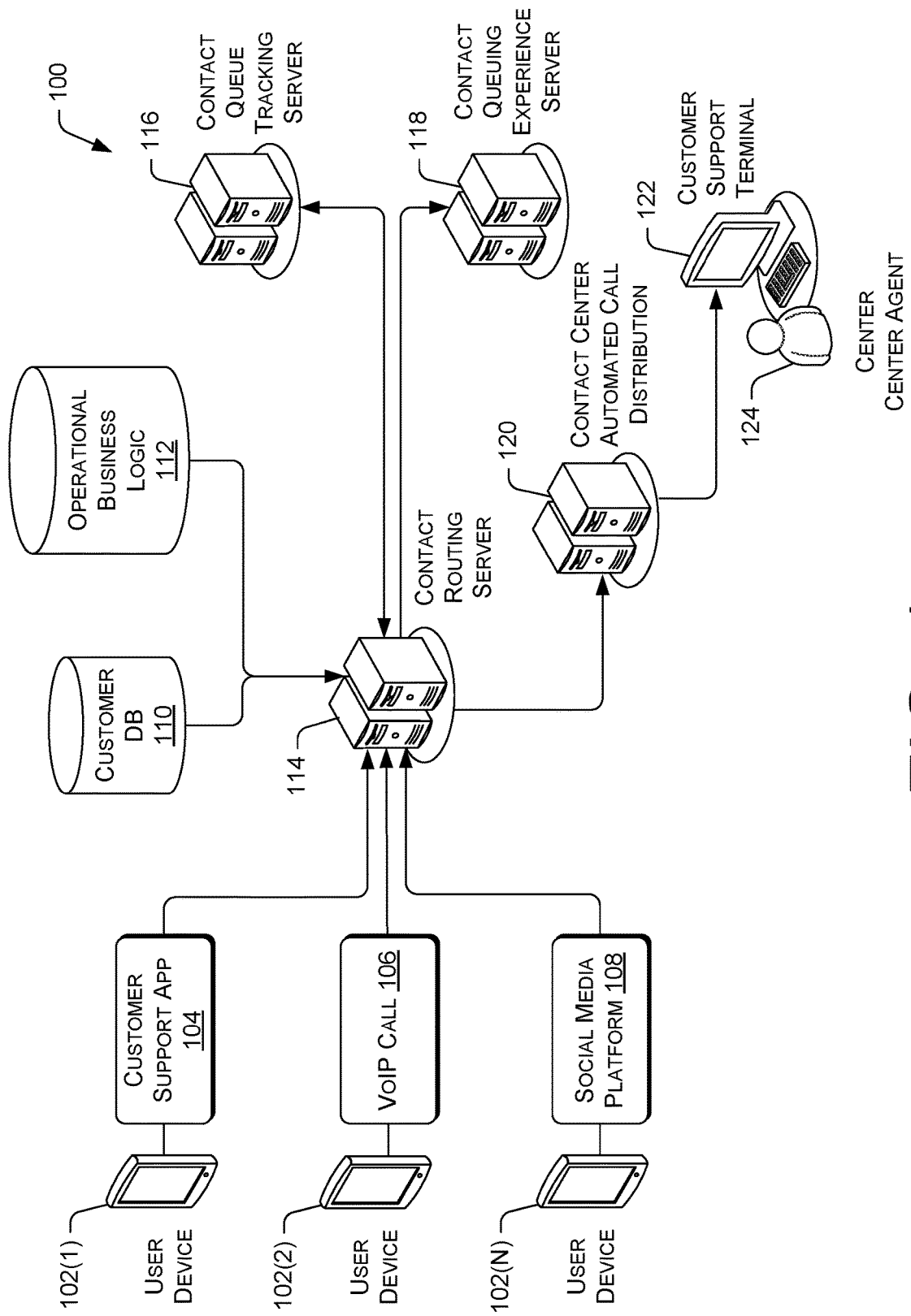
FIG. 1 illustrates an example of network architecture for implementing vertical stack queuing customer care routing.

This disclosure is directed to techniques for routing customer service requests to a contact queue pool associated with a stack queue and a group of agents of a telecommunication service provider. In some aspects, the request is placed in a specific contact queue pool that may include agents belonging to one or more groups to minimize the wait time until the request is served. The individual groups of agents may include agents that specialize in solving various service issues. For example, the service issues may include a user account issue, a billing issue, a device issue, a network issue, a technical issue, and/or so forth.

In some aspects, a contact routing server of the telecommunication service provider may initially receive an incoming request from a user device associated with a subscriber of the telecommunication service provider. The contact routing server may identify one or more groups of agents available to serve the request based on one or more factors. Such factors may include the workloads of contact center agents, the geographical proximity of the contact center agent to the location of the subscriber, the nature of the service issue specified in the request, and/or so forth. Other factors may include whether a current service account or a former service account associated with the subscriber is already assigned to a particular contact center agent. The contact routing server may also identify one or more groups of agents based at least on operational business logic of the telecommunication service provider.

The contact routing server may initially place an incoming request in a first level of contact queue pool that includes a group of agents and a stack queue. The contact routing server may determine whether a wait time associated with the stack queue at the first level of contact queue pool exceeds a predetermined threshold. If the wait time exceeds the predetermined threshold, the contact routing server may identify an additional group of agents available to serve the request. The predetermined threshold for the wait time may depend on operational business logic. In some aspects, the additional group of agents may comprise a shared group, which may at least partially include the group of agents. In other aspects, the shared group may include a group of agents not in the original group of agents. In yet other aspects, the additional group of agents may comprise a universal group, which may include at least partially the group of agents and/or the shared group of agents.

The contact routing server may route the request to a second level of contact queue pool that includes a shared group of agents. In some aspects, requests from multiple groups of agents at the first level of contact queue pool may be routed to the same shared group of agents. As the one or more additional groups of agents are made available to serve the request, the wait time until the request is served may decrease. The contact routing server may determine whether a wait time associated with the stack queue at a second level of contact queue pool exceeds an additional predetermined threshold. If the wait time exceeds the additional predetermined threshold, the contact routing server may identify a universal group of agents to serve the request and route the request to a third level of contact queue pool that includes the universal group of agents. While the one or more groups or shared groups of agents may be available to serve a request simultaneously at different levels of contact queue pool, the individual groups of agents remain distinct. Once a contact center agent becomes available, a contact center automated call distributor (ACD), which interfaces with a customer support terminal, routes the request to the available agent at the customer support terminal.

In some aspects, a contact queue tracking server of the telecommunication service provider may subsequently track the routed requests to generate call center performance metrics and analyze call center key performance indicators (KPIs). For example, the call center KPIs may include a percentage of calls blocked, average wait time in queue, average abandonment rate, service level, an average speed of answer, average handle time, average after call work time, first call resolution, occupancy rate, and/or so forth. Because the individual groups of agents remain distinct, the contact queue tracking server may identify the agent group that serves the request by associating the agent group with a stack queue and/or level of contact queue pool to generate metrics and KPIs on a per group and per agent basis.

Accordingly, identifying one or more groups of agents associated with certain contact queue pool with the shortest wait times may improve operational efficiency, increase customer satisfaction, and grow customer retention. Further, the techniques described herein may be implemented in a number of ways. Example implementations are provided below with reference to the following figures.

Example Network Architecture

FIG. 1 illustrates an example architecture 100 for implementing vertical stack queuing customer care routing. The architecture 100 may include one or more user devices 102(1)-102(N) operated by one or more subscribers of a telecommunication service provider. The user devices 102(1)-102(N) comprise smartphones, mobile devices, personal digital assistants (PDAs), or other electronic devices having a wireless communication function that is capable of receiving input, processing the input, and generating output data. The user devices 102(1)-102(N) are connected to a telecommunication network utilizing one or more wireless base stations or any other common wireless or wireline network access technologies.

The network can be a cellular network that implements 2G, 3G, 4G, 5G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet).

The user devices 102(1)-102(N) may transmit a request for customer support to a contact routing server 114. The contact routing server 114 may in turn route the request to a contact center agent 124 at a customer support terminal 122 via a contact center ACD 120. In the illustrated embodiment, a subscriber may use the user device 102(1) to communicate with the contact center agent at the customer support terminal 122 via a customer support application 104 residing on the user device 102(1). The customer support application 104 can be supported by a telecommunication service provider or a third-party entity that is working with the telecommunication service provider. In various embodiments, the customer support application 104 can provide a knowledge base where subscribers can access answers to common questions, conversation interfaces (CI) or chat user interfaces (UI) for interacting with other subscribers or a contact center agent 124, a messaging tool, a trouble ticket generation tool, and/or so forth.

The customer support terminal 122 can include one or more computing devices operated by a contact center agent 124 working with a telecommunications service provider. The contact center agent 124 may be assigned to a group of agents based on one or more factors. Such factors may include the contact center agent's 124 location, experience, skills, service category, and/or so forth. The agent 124 may be associated with an agent identifier 124, a group identifier of the group of agents to which the agent 124 is assigned, a unique identifier associated with the customer support terminal 122, a stack queue, and/or so forth.

The customer support terminal 122 can be configured to execute customer service software applications for interfacing with customers, generating customer service session notes, managing trouble tickets, and/or so forth. Additionally, a subscriber may use the user device 102(2) to directly communicate with the contact center agent 124 at the customer support terminal 122 via a voice over Internet protocol (VoIP) call 106. A subscriber may also use the user device 102(N) to communicate with the contact center agent 124 at the customer support terminal 122 via a social media platform 108, which can include a discussion forum for interacting with other subscribers or the contact center agent 124. Accordingly, a request for customer support may be transmitted using any audio and/or video means, including signals, data, or messages transmitted through user devices 102(1)-102(N), text chat, web sessions, instant messaging, short message service (SMS), email, and/or so forth.

A request for customer support may include a subscriber's telephone number (i.e., Mobile Subscriber Integrated Services Digital Network [MSISDN] number) and a subscriber's International Mobile Subscriber Identity (IMSI) that uniquely identifies the subscriber. The request may also include a reference number associated with a previous customer support session, user account information (e.g., account number), and/or so forth. Additionally, the request may include information relating to a service issue or a reason for the request. Such service issues or reasons for the request can include being dissatisfied with a product or service, experiencing technical troubles, billing questions, account questions, seeking additional information about a product or service, and/or so forth. The service issue may be organized by the service category. The contact routing server 114 may identify one or more groups of agents available to serve the request based at least on the aforementioned information included in the request. For example, the contact routing server 114 may identify a group of agents that can serve requests associated with a service issue in a particular service category.

The contact routing server 114 may also request user-related and/or subscription-related information associated with the requesting user device from a customer database 110 to obtain supplemental information or to verify the information provided in the request. In one example, the customer database 110 may be a Home Location Register (HLR)/Home Subscriber Server (HSS).

In some aspects, the contact routing server 114 may identify one or more groups of agents available to serve the request based at least on user-related or subscription-related information. In one example, the subscription-related information may include information relating to the specific type of the requesting user device for which the subscriber is requesting assistance. Based at least on the type of the requesting user device, the contact routing server 114 may identify an available group of agents with technical expertise, skills, knowledge in analyzing problems, diagnosing issues, and troubleshooting solutions associated with the requesting user device. The groups of agents may be identifiable via a group number or other unique identifier associated with the group. In another example, the user-related information may include information relating to the subscriber's location. Based at least on the subscriber's location, the contact routing server 114 may identify an available group of agents that are in geographical proximity to the location of the subscriber.

The contact routing server 114 may also identify one or more groups of agents to serve a request based at least on one or more operational business logic stored at the operational business logic database 112. The operational business logic database 112 provides dynamic pool expansion timing thresholds and other predetermined rules for making available different agent groups to serve the request. The operational business logic may depend on call center performance metrics and call center KPIs such as a percentage of calls blocked, average wait time in queue, average abandonment rate, service level, an average speed of answer, average handle time, average after call work time, first call resolution, occupancy rate, and/or so forth.

The percentage of blocks is the percentage of inbound calls, messages, or requests that received a busy tone or an automated message. The average time in queue is the total time subscribers wait in contact queues divided by the total number of requests answered by agents. The average abandonment rate is the percentage of subscribers who hang up or cancel requests for customer support before reaching an agent. The service level is the percentage of requests answered within a specified number of time units (e.g., seconds). The average speed of answer is the average time it takes for requests to be answered in the call center during a specific time frame. The average handle time is the time elapsed from when an agent answers a request until the agent disconnects. The average after call work time is the time an agent spends completing a transaction after the subscriber has disengaged. The first call resolution is the percentage of requests that the agent completely addresses subscriber's needs without having to transfer, escalate or return the call. The occupancy rate is the amount of time agents are on live calls or chats as well as completing work associated with the request.

Upon identifying an available group of agents to serve the request, the contact routing server 114 may place an incoming request in a contact queue pool that includes the identified group of agents. The identified group of agents is also associated with a stack queue. For example, the first group of agents may be identified as available to serve the request, and the first group of agents is associated with a first stack queue. The request may be placed in the first level of contact queue pool that includes the first group of agents. If a wait time associated with the first stack queue at the first level of contact queue pool exceeds a first predetermined threshold, a second group of agents in addition to the first group of agents may become available to serve the request and the request may be placed in the second level of contact queue pool, which may decrease the wait time. The second group of agents may include agents with similar technical expertise, skills, and service category as the agents in the first group of agents. Some or all of the first group of agents and the second group of agents can be collectively referred to as a shared group of agents which can then serve a stack queue. In some aspects, the shared group of agents may not include the first group of agents. The shared group of agents may be included in the second level of contact queue pool.

If a wait time associated with the stack queue exceeds a second predetermined threshold at the second level of contact queue, a third group of agents in addition to the first and second group of agents (i.e., the shared group of agents) may become available to serve the request and the request may be placed in the third level of contact queue pool, and so on. In one example, the third group of agents can be a universal group of agents including at least partially the shared group of agents and/or the first group of agents. Accordingly the universal group of agents may include agents with similar technical expertise, skills, and service category as the agents in the initial first group of agents. The universal group of agents may be included in the third level of contact queue pool.

The contact routing server 114 may be in communication with a contact center ACD 120, which interfaces with a customer support terminal 122. The ACD 120 includes communication systems designed to route an incoming request to an available agent 124 at the customer support terminal 122. In some embodiments, the contact routing server 114 may be in communication with a plurality of ACDs that may be distributed across multiple geographic regions. In one example, the ACD 120 may be a central automatic call distributor that distributes incoming calls to agents distributed across multiple cities and geographic regions. The ACD 120 may ensure that calls are properly and/or evenly distributed to customer support terminals 122.

The contact queue tracking server 116 keeps track of routed requests to generate call center performance metrics and analyze call center KPIs. In one example, the contact queue tracking server 116 may identify the agent 124 that serves the request at the customer support terminal 122. Based at least on the identifying information associated with the agent, the contact queuing tracking system 116 identifies the stack queue, the group, the shared group, and/or the universal group with which the agent is associated. Additionally, the contact queuing tracking system 116 may determine at the level of contact queue pool at which the request was served by the agent 124.

Accordingly, the contact queue tracking server 116 can calculate metrics and analyze KPIs on a per-agent basis as well as a per-group basis. The contact queue tracking server 116 may generate recommendations based at least on the metrics and the analysis to modify operational business logic. For example, the contact queue tracking server 116 may recommend changing dynamic pool expansion timing thresholds and modifying predetermined rules for making available different agent groups to serve incoming requests.

The contact queuing experience server 118 may be configured to analyze customer experience and feedback. In one example, the contact queuing experience server 118 may be configured to receive the performance metrics and call center KPIs from the contact queue tracking servers 116 to assign performance scores to individual metrics and call center KPIs. Additionally, the contact queuing experience server 118 may be configured to conduct surveys and receive feedback from subscribers. The surveys may be provided to subscribers at the end of a customer support call or after a service issue is resolved. In various embodiments, the surveys may be presented within a customer support application 104. Similarly, the feedback module may be configured to receive feedback from subscribers at the end of a customer support call or after a service issue is resolved. The customer support application 104 may provide an interface for submitting feedback to the contact queuing experience server 118.

Vertical Stack Queuing

Figure 2:
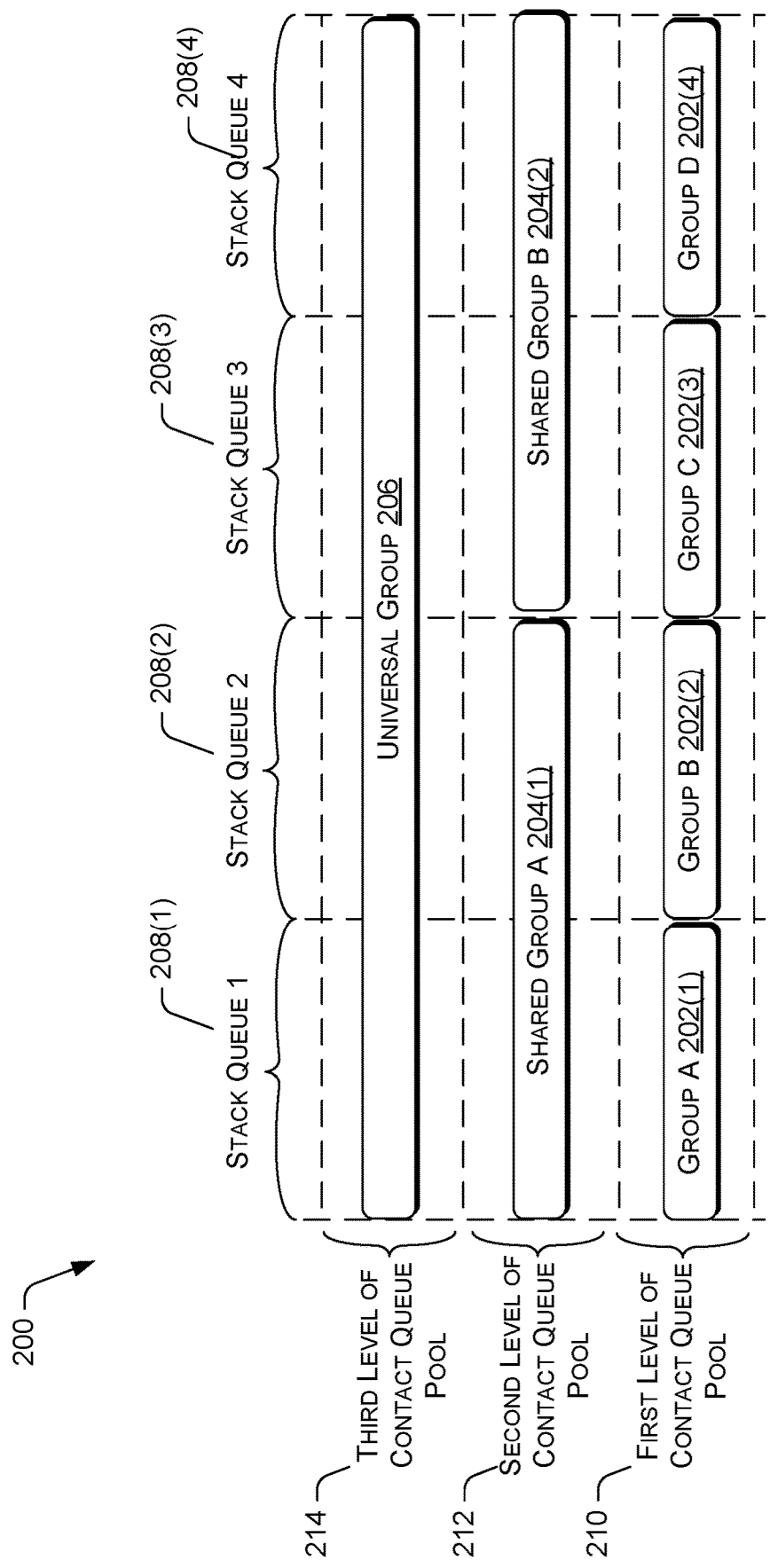
FIG. 2 is an organizational diagram of an example embodiment of a vertical stack queuing configuration.

FIG. 2 is a block diagram of an example embodiment of a vertical stack queuing configuration. FIG. 2 shows four distinct groups, Group A 202(1), Group B 202(2), Group C 202(3), and Group D 202(4). Additional groups may be included, depending upon embodiments. The individual groups may represent a group of contact center agents that may be organized by one or more factors such as workloads of contact center agents, the geographical proximity of the contact center agent to the location of the subscriber, the nature of the service issue specified in the request, and/or so forth.

Requests from Group A 202(1) and Group B 202(2) may be routed to Shared Group A 204(1) at the second level of contact queue pool 212. One or more agents from Groups A 202(1) and/or Group B 202(2) may be associated with Shared Group A 204(1). Alternatively, Shared Group A 204(1) may comprise agents not belonging to Groups A and B 202(1) and 202(2). Similarly, requests from Group C 202(3) and Group D 202(4) may be routed to Shared Group B 204(2) at the second level of contact queue pool 212. One or more agents from Groups C 202(3) and/or Group D 202(4) may be associated with Shared Group B 204(2). Alternatively, Shared Group B 204(2) may comprise agents not belonging to Groups C and D 202(3) and 202(4). Requests from Shared group A 204(1) and Shared group B 204(2) (i.e., requests from all four groups—Group A 202(1), Group B 202(2), Group C 202(3), and Group D 202(4)) may be routed to a universal group 206 at the third level of contact queue pool 214. In some aspects, request from additional groups (not pictured) may be routed to the universal group 206.

The individual distinct groups are associated with a stack queue. The individual stack queues 208(1)-208(4) may be associated with a respective set of predetermined parameters as defined by operational business logic such as the length of wait times that a request may remain on queue until the next level of contact queue pool is made available to serve the request. FIG. 3 is a table showing predetermined thresholds for wait times for each stack queue at various levels of contact queue pool.

For instance, Group A 202(1) is in Stack Queue 1 208(1). Stack Queue 1 208(1) is associated with the first set of predetermined thresholds for wait times 216(1)-216(3). Similarly, Group B 202(2) is in Stack Queue 2 208(2), which is associated with the second set of predetermined thresholds for wait times 218(1)-218(3). Group C 202(3) is in Stack Queue 3 208(3) and is associated with the third set of predetermined thresholds for wait times 220(1)-220(3). Finally, Group D 202(4) is in Stack Queue 4 208(4) and is associated with the fourth set of predetermined thresholds for wait times 222(1)-222(3), and so on.

Group A 202(1), Group B 202(2), Group C 202(3), and Group D 202(4) are associated with the first level of contact queue pool 210. Additionally, at the first level of contact queue pool 210, Stack Queue 1 208(1) corresponding to Group A 202(1) may be associated with a first wait time threshold 216(1). Similarly, at the first level of contact queue pool 210, Stack Queue 2 208(2) corresponding to Group B 202(2) may be associated with a second wait time threshold 218(1). At the first level of contact queue pool 210, Stack Queue 3 208(3) corresponding to Group C 202(3) may be associated with a third wait time threshold 220(1). Finally, at the first level of contact queue pool 210, Stack Queue 4 208(4) corresponding to Group D 202(4) may be associated with a fourth wait time threshold 222(1).

At the second level of contact queue pool 212, Stack Queue 1 208(1) corresponding to Group A 202(1) may be associated with a fifth wait time threshold 216(2). Similarly, at the second level of contact queue pool 212, Stack Queue 2 208(2) corresponding to Group B 202(2) may be associated with a sixth wait time threshold 218(2). At the second level of contact queue pool 212, Stack Queue 3 208(3) corresponding to Group C 202(3) may be associated with a seventh wait time threshold 220(2). Finally, at the second level of contact queue pool 212, Stack Queue 4 208(4) corresponding to Group D 202(4) may be associated with an eighth wait time threshold 222(2).

At the third level of contact queue pool 214, Stack Queue 1 208(1) corresponding to Group A 202(1) may be associated with a ninth wait time threshold 216(3). Similarly, at the third level of contact queue pool 214, Stack Queue 2 208(2) corresponding to Group B 202(2) may be associated with a tenth wait time threshold 218(3). At the third level of contact queue pool 214, Stack Queue 3 208(3) corresponding to Group C 202(3) may be associated with an eleventh wait time threshold 220(3). Finally, at the third level of contact queue pool 214, Stack Queue 4 208(4) corresponding to Group D 202(4) may be associated with a twelfth wait time threshold 222(3).

When a request for customer support is initially received at a contact routing server, the request is placed at the first level of contact queue pool 210. Additionally, the request may be routed to the first level of contact queue pool 210 associated with Group A 202(1), Group B 202(2), Group C 202(3), or Group D 202(4) based at least on one or more factors such as workloads of contact center agents, the geographical proximity of the contact center agent to the location of the subscriber, the nature of the service issue specified in the request, and/or so forth. Other factors may include whether a current service account or a former service account associated with the subscriber is already assigned to a particular contact center agent. In this case, the request may be placed in the first level of contact queue pool 210 associated with the group with which the particular contact center agent is associated.

If a wait time associated with a stack queue at the first level of contact queue pool 210 exceeds a predetermined threshold, additional groups of agents may become available to serve the request at the second level of contact queue pool 212. For example, if a wait time for a request routed to Group A 202(1) in Stack Queue 1 208(1) at the first level of contact queue pool 210 is more than the first wait time threshold 216(1), agents in the Shared group A 204(1) are made available to serve the request at the second level of contact queue pool 212. Similarly, if a wait time for a request at the second level of contact queue pool 212 is more than the fifth wait time threshold 216(2), agents in the Universal Group 206 are made available to serve the request at third level of contact queue pool 214. While FIG. 2 shows three levels of contact queue pool (i.e., the first level of contact queue pool 210, the second level of contact queue pool 212, third level of contact queue pool 214); any number of vertical levels of contact queue pools may be implemented.

Discrete Agent Groups

Figure 4:
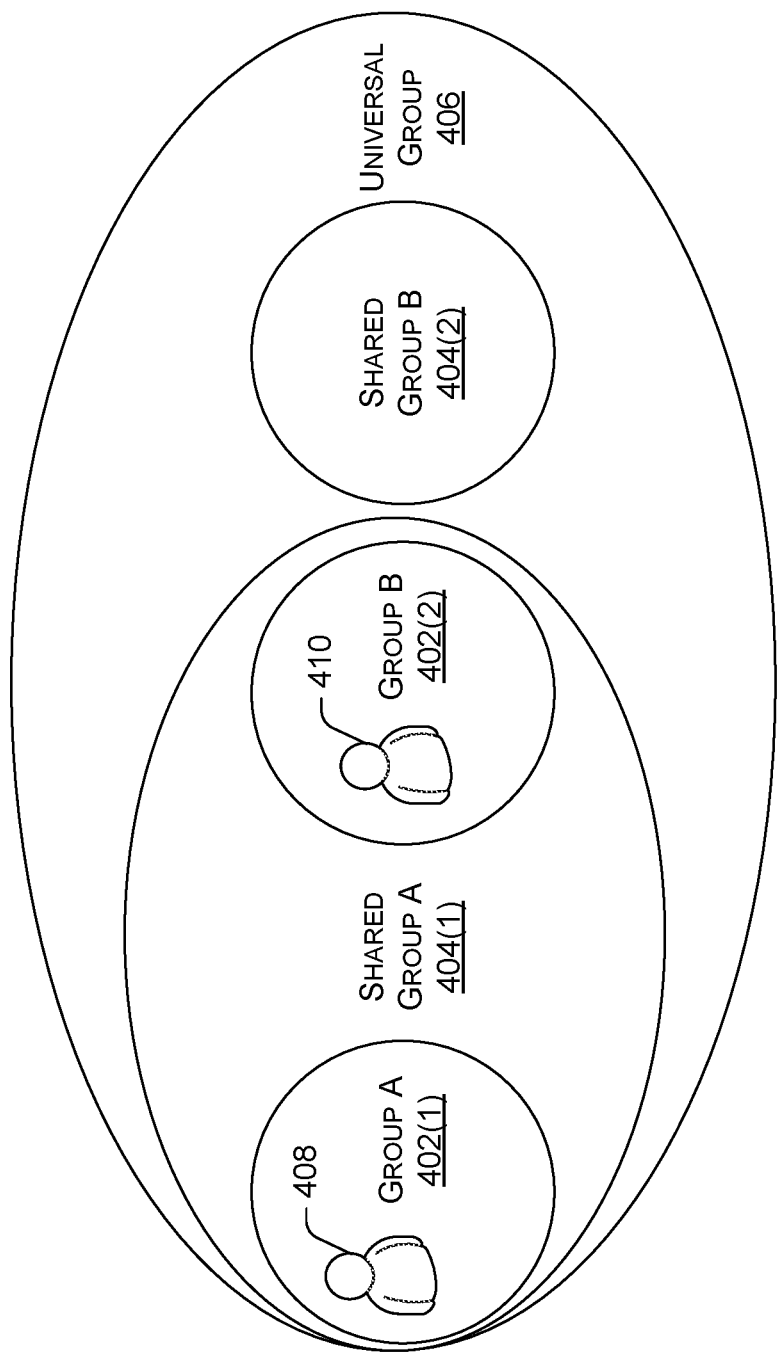
FIG. 4 is an example of a diagram for identifying discrete agent groups that serve customer service requests.

FIG. 4 is an example of a diagram for identifying discrete groups of agents. As additional agent groups are made available to serve incoming requests based at least on one or more factors and predetermined parameters as defined by operational business logic (e.g., wait times), the agents remain in distinct groups. The agents may be associated with one or more levels of contact queue pool. Particularly, as additional groups of agents become available, an incoming request for customer support may be served by an agent at a particular call queue pool level.

In the illustrated embodiment, a request may be placed on a queue for Group A 402(1) at the first level of contact queue pool. Group A 402(1) in FIG. 4 may correspond to Group A 202(1) in FIG. 2. Subsequently, additional groups of agents in Shared Group A 404(1) may become available to serve the request. Shared Group A 404(1) may correspond to Shared Group A 204(1) in FIG. 2. Shared Group A 404(1) may include some or all agents that are associated with Group A 402(1). Shared Group A 404(1) may also include some or all agents that are associated with additional groups such as Group B 402(2), which may correspond to Group B 202(2) of FIG. 2. Alternatively, Shared Group A 404(1) may include a reserved group of agents not in Group A 402(1) and Group B 402(2). One or more agents in Shared Group A 404(1) may be a part of a universal group 406. The universal group 406 may correspond to the universal group 206 of FIG. 2. The universal group 406 may include agents from additional groups (not pictured).

As discussed above, Group A 402(1) is associated with the first level of contact queue pool and a stack queue. Similarly, Shared Group A 404(1) is associated with the second level of contact queue pool. Finally, the universal group of agents 406 is associated with the third level of the contact queue pool. Groups of agents included in the universal group of agents 406 may also be associated with the third level of contact queue pool. As multiple groups of agents are made available to serve the request, agents may be available at multiple levels of contact queue pool simultaneously. For example, an agent may be available at first, second, and third levels of contact queue pool. In another example, an agent may be available at one or more levels of contact queue pool, but not available other levels of contact queue pool (e.g., available at the first and third levels of contact queue pool, but not available at the second level of contact queue pool). FIG. 4 shows a first agent 408 in Group A 402(1) and a second agent 410 in Group B 402(2). In some aspects, the first agent 408 may be available at the first level of contact queue pool in Group A 402(1) and at the second level of contact queue pool in Shared Group A 404(1). Conversely, the second agent 410 may be available at the first level of contact queue pool in Group B 402(2) and at the third level of contact queue pool in the universal group 406. Regardless of the level(s) of contact queue pool in which an agent is available, each agent remains in its respective groups (i.e., Group A 402(1), Group B 402(2)).

When the request is placed on a queue for Group A 402(1) at the first level of contact queue pool, agents in Group A 402(1) (e.g., the first agent 408) are made available to serve the request. If the wait time for the stack queue at the first level of contact queue pool exceeds a predetermined threshold, the agents in Group A 402(1) and in Shared Group A 404(1) may be available to serve the request. If one or more agents in Group B 402(2) are a part of Shared Group A 404(1), those agents may also be available as part of Shared Group A 404(1). This process continues until the universal group of agents 406 becomes available to serve the request. In the illustrated embodiment, the universal group of agents includes additional groups of agents such as Shared Group B 404(2).

If the request is served by a first agent 408 at the first level of call queue pool or the second level of call queue pool (i.e., when Shared Group A 404(1) is made available), the contact queue tracking server may identify Group A 402(1) as the group that served the request. In the latter case, because the first agent 408 is available at both the first and second levels of call queue pool, the contact queue tracking server may determine the level of call queue pool at which the request was served. If the request is served by the second agent 410 at the second level of call pool level (i.e., when Shared Group A 404(1) is made available) or the third level of call pool level (i.e., when the universal group 406 is made available), the contact queue tracking server may identify Shared Group A 404(1) as the group that served the request and the level of call queue pool at which the group served the request. Accordingly, the contact queue tracking server may distinctly identify the agent, group, stack queue, and/or the level of call pool at which the request was served even if the same agent from a group is available to serve the request at multiple levels simultaneously.

Example Computing Device Components

Figure 5:
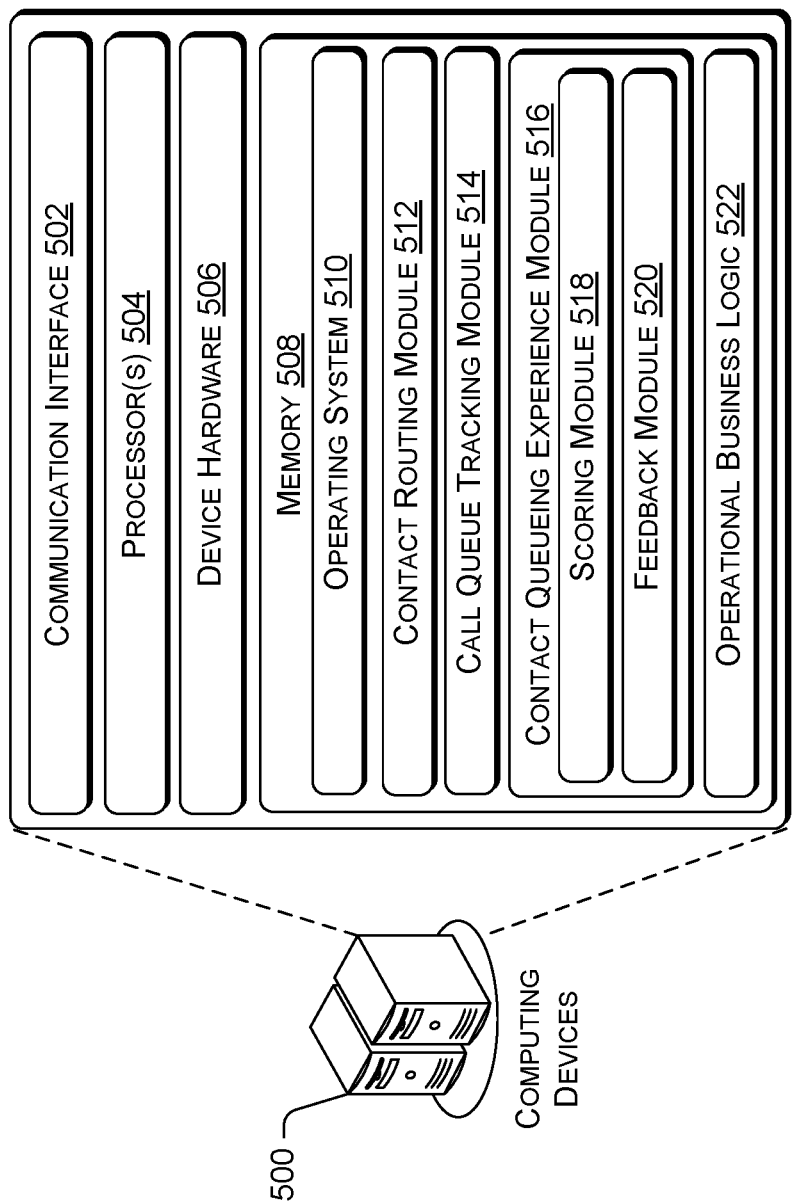
FIG. 5 is a block diagram showing various components of an illustrative computing device that implements vertical stack queuing customer care routing.

FIG. 5 is a block diagram showing various components of illustrative computing devices 500, wherein the computing devices 500 can include one or more servers of FIG. 1 such as the contact routing server. The contact routing server may be a physical server, a virtual server, and/or a system operating in a cloud-based environment and/or a containerized environment. It is noted that the computing devices 500 as described herein can operate with more or fewer of the components shown herein. Additionally, the computing devices 500 as shown herein or portions thereof can serve as a representation of one or more of the computing devices of the present system.

The computing devices 500 may include a communication interface 502, one or more processors 504, hardware 506, and memory 508. The communication interface 502 may include wireless and/or wired communication components that enable the computing devices 500 to transmit data to and receive data from other networked devices. In at least one example, the one or more processor(s) 504 may be a central processing unit(s) (CPU), graphics processing unit(s) (GPU), both a CPU and GPU or any other sort of processing unit(s). Each of the one or more processor(s) 504 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 504 may also be responsible for executing all computer applications stored in the memory, which can be associated with common types of volatile (RAM) and/or nonvolatile (ROM) memory. The hardware 506 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 508 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 508 may also include a firewall. In some embodiments, the firewall may be implemented as hardware 506 in the computing devices 500.

The processors 504 and the memory 508 of the computing devices 500 may implement an operating system 510, a contact routing module 512, a contact queue tracking module 514, and a contact queuing experience module 516. The operating system 510 may include components that enable the computing devices 500 to receive and transmit data via various interfaces (e.g., user controls, communication interface, and/or memory input/output devices), as well as process data using the processors 504 to generate output. The operating system 510 may include a presentation component that presents the output (e.g., display the data on an electronic display, store the data in memory, transmit the data to another electronic device, etc.). Additionally, the operating system 510 may include other components that perform various additional functions generally associated with an operating system.

The contact routing module 512 may be configured to route incoming requests from user devices. In one example, a request may include user-related information, subscription-related information, and/or other information such as identifying information and service issues. Based at least on the user-related information, subscription-related information, and/or other information in the request, the contact routing module 512 may identify one or more groups of agents available to serve the request based on one or more factors (e.g., workloads of contact center agents, locations of contact centers and subscribers, service issue, previous support sessions, etc.). Additionally, the contact routing module 512 may make routing decisions based at least on the operational business logic 522.

Once the request is routed to a group of agents, the contact routing module 512 may determine whether a wait time for a stack queue associated with the group at the first level of contact queue pool has exceeded a predetermined threshold associated with the stack queue. If the wait time has exceeded the predetermined threshold, the contact routing module 512 routes the request to the second level of contact queue pool. The second level of contact queue pool is associated with a shared group of agents, which may include some or all of the originally identified group of agents and an additional group of agents. The additional group of agents may also be associated with an additional stack queue having a corresponding wait time thresholds. The wait time thresholds for the stack queue may be the same as or different from the wait time thresholds for the additional stack queue.

Once the request is routed to the shared group at the second level of contact queue pool, the contact routing module 512 may determine whether an additional wait time for the stack queue associated with the shared group at the second level of contact queue pool has exceeded an additional predetermined threshold associated with the stack queue. If the additional wait time has exceeded the additional predetermined threshold, the contact routing module 512 routes the request to the third level of the contact queue pool. The third level of contact queue pool is associated with a universal group of agents, which may include some or all of the shared group of agents and an additional shared group of agents. The request may be served by the first available agent in the (original) group, in the shared group, or the universal group of agents.

Once the request is served by the first available agent, the contact queue tracking module 514 may identify the group with which the agent is associated. In this regard, the contact queue tracking module 514 may determine whether the agent is associated with a stack queue that is associated with the group. Additionally, the contact queue tracking module 514 may determine whether the request was served at the first level of contact queue pool, the second level of contact queue pool, or the third level of contact queue pool. The contact queue tracking module 514 may keep track of routed requests to generate call center performance metrics and analyze call center KPIs (e.g., a percentage of calls blocked, average wait time in queue, average abandonment rate, service level, an average speed of answer, average handle time, average after call work time, first call resolution, occupancy rate, etc.). These KPIs are tracked discretely within each level of contact queue pool and between different agent groups to provide the reporting granularity for each unique agent group.

In some aspects, the contact queue tracking module 514 may generate recommendations for the operational business logic 522 based at least on call center KPIs and/or other performance metrics. For example, the contact queue tracking module 514 may recommend to increase wait time thresholds for a first stack queue associated with a first group and decrease wait time thresholds for a second stack queue associated with a second group. In another example, the contact queue tracking module 514 may recommend making a group of agents temporarily unavailable to serve incoming requests if the percentage of calls blocked exceeds a predetermined threshold. Instead, the contact queue tracking module 514 may recommend the contact routing module 512 to route incoming requests to another group of agents until the average wait time in queue is below an additional predetermined threshold.

Based at least on the performance metrics and call center KPIs from the contact queue tracking module 514, the contact queuing experience module 516 may assign performance scores to individual metrics and call center KPIs via a scoring module 518. In one example, the scoring module 518 may determine performance scales based at least on a scoring scale. In another example, the scoring module 518 may assign performance scores based at least on the operational business logic 522. The scoring module 518 may also calculate an overall performance score for a call center or a group of agents based at least on individual performance scores. In one instance, the individual performance scores for average wait time, average abandonment rate, and percentage of calls blocked for a set of agents in a group are $A_t$:80, $A_a$:85, $A_b$:90, respectively, then the overall performance score may be calculated as the average of the individual performance scores, as represented in the following equation:

$$A_{avg} = \frac{(A_t + A_a + A_b)}{n}.$$

Accordingly, the overall performance score $$(A_{avg}) \text{ is } 85 = \frac{(80 + 85 + 90)}{3}.$$

The individual performance scores may be weighted based at least on the operational business logic 522. For example, the average abandonment rate may be given additional weight compared to the average wait time and the percentage of calls blocked. In such an example, if the average wait time for the group is 5 minutes, then a weight value of 0.95 may be applied to $A_t$:80 or 80*0.95=76. However, if the average abandonment rate for the group is 5%, then a weight value of 1.05 may be applied to $A_a$:85 or 85*1.05=89.25. In another instance, if the percentage of calls blocked is 5%, then a weight value of 0.08 may be applied to $A_b$:90 or 90*0.8=72.

In some aspects, the scoring module 518 may interface with a feedback module 520, which may be configured to conduct surveys and collect feedback from subscribers. For example, the feedback module 520 may transmit customer satisfaction surveys to subscribers that request customer support. The customer satisfaction surveys may be provided to the subscribers via a customer support application. Customer satisfaction surveys can also be conducted over the phone after a call with a contact center agent. Customer satisfaction surveys can also be sent to subscribers in an email or SMS as a link. The customer satisfaction surveys may allow subscribers to rate their experience on a scale and/or to provide comments about their experience with a contact center agent. In one example, the scale may include a score of 0 for extremely dissatisfied, 1 for dissatisfied, 2 for neither satisfied nor dissatisfied, 3 for satisfied, and 4 for extremely satisfied.

Additionally, the results from the surveys and the feedback may be used to modify the performance scores, which can in turn be used for contact center agent training and modify operational business logic. For example, if the customer satisfaction surveys indicate that a customer is extremely dissatisfied with the average wait time, a weight value of 0.95 may be decreased by half or a weight value of 0.475 may be applied to $A_r$:80 or 80*0.475=38. However, if the customer satisfaction surveys indicate that the customer is extremely satisfied with the average wait time, a weight value of 0.95 may be increased by two fold or a weight value of 1.9 may be applied to $A_r$:80 or 80*1.9=152. If the customer satisfaction surveys indicate that the customer is neither satisfied nor dissatisfied, a weight value of 0.95 may remains the same.

Example Processes

Figure 6:
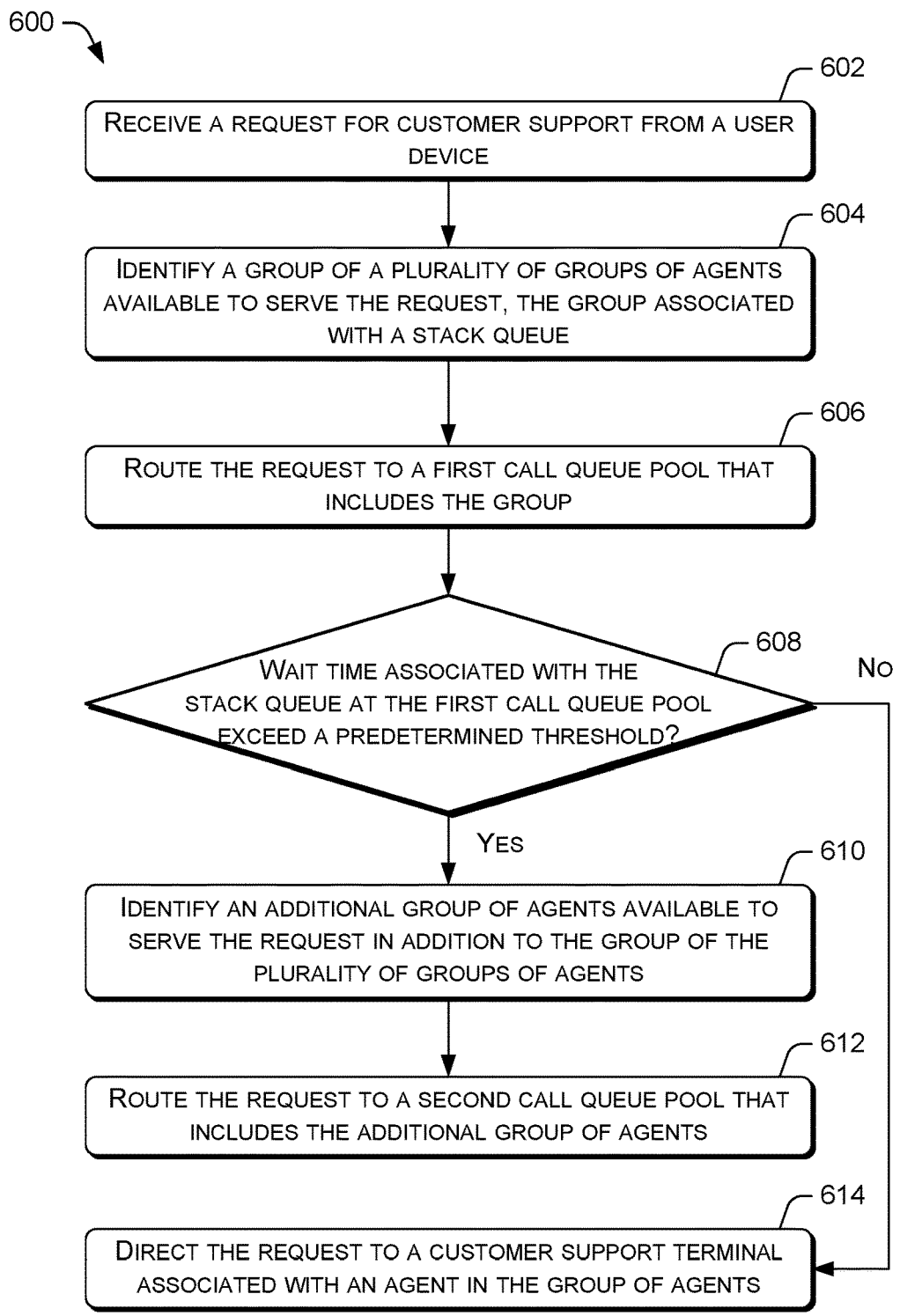
FIG. 6 is a flow diagram of an example process for implementing vertical stack queuing customer care routing.

FIG. 6 presents an illustrative process 600 for routing customer support requests. The process 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 600 is described with reference to FIGS. 1-5.

FIG. 6 is a flow diagram of an example process 600 for implementing vertical stack queuing customer care routing from the perspective of a contact routing server. At block 602, the contact routing server receives a request for customer support from a user device. The user device is associated with a subscriber of a telecommunication service provider. At block 604, the contact routing server identifies a group of a plurality of groups of agents available to serve the request. The group may be associated with a stack queue. The contact routing server may identify the group based at least on one or more factors and/or operational business logic. At block 606, the contact routing server routes the request to the first level of contact queue pool that includes the group.

At decision block 608, the contact routing server determines whether a wait time associated with the stack queue at the first level of contact queue pool exceeds a predetermined threshold. If the wait time exceeds the predetermined threshold ("yes" from block 608), the contact routing server identifies an additional group of agents available to serve the request, such that the group of agents and the shared group of agents may be available to serve the request, as indicated in block 610. In some aspects, the shared group of agents may include one or more agents in the group of agents. Alternatively, the shared group of agents may be a reserved group of agents that do not include the group of agents. At block 612, the contact routing server routes the request to a second call queue pool that includes the shared group of agents. If the wait time does not exceed the first predetermined threshold ("no" from block 608), the contact routing server directs the request to a customer support terminal associated with an agent in the group of agents, as indicated in block 614.

In some embodiments, the identifying of new additional groups of agents for new contact queue pools and routing requests to such new contact queue pools may be repeated for a predetermined number of times if the wait time associated with any currently allocated queue pool exceeds a corresponding threshold. In other words, operations similar to those described in blocks 608-612 may be repeated for the predetermined number of times when applicable.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving a request for customer support from a user device;
   identifying a group of a plurality of groups of agents available to serve the request, the group associated with a stack queue;
   routing the request to a first level of contact queue pool that includes the group;
   monitoring, in relation to the request, a wait time associated with the stack queue;
   upon detecting that the wait time associated with the stack queue has exceeded a predetermined threshold,
   identifying an additional group of agents available to serve the request in addition to the group of the plurality of groups of agents, wherein the group and the additional group of the plurality groups of agents are distinct from each other; and
   routing the request to a second level of contact queue pool that includes the additional group of agents.

2. The one or more non-transitory computer-readable media of claim 1, wherein the acts further comprise:
   directing the request to a customer support terminal associated with a contact center agent.

3. The one or more non-transitory computer-readable media of claim 2, wherein the acts further comprise:
   determining whether the contact center agent is associated with the group or the additional group of the plurality of groups of agents based at least on whether the contact center agent is associated with the stack queue; and
   if the contact center agent is associated with the stack queue, associating the contact center agent with the group.

4. The one or more non-transitory computer-readable media of claim 2, wherein the additional group of the plurality of groups of agents is associated with an additional stack queue.

5. The one or more non-transitory computer-readable media of claim 4, wherein the acts further comprise:
   determining whether the contact center agent is associated with the group or the additional group of the plurality of groups of agents based at least on whether the contact center agent is associated with the additional stack queue; and
   if the contact center agent is associated with the additional stack queue, associating the contact center agent with the additional group.

6. The one or more non-transitory computer-readable media of claim 1, wherein the acts further comprise:
   determining whether an additional wait time associated the stack queue at the second level of contact queue pool exceeds an additional predetermined threshold;
   if the additional wait time exceeds the additional predetermined threshold, identifying a universal group of agents available to serve the request, the universal group of agents comprising the additional group and the group of agents; and
   routing the request to a third level of contact queue pool that includes the universal group of agents.

7. The one or more non-transitory computer-readable media of claim 6, wherein the request is associated with only the stack queue of a plurality of stack queues at the first level of contact queue pool, the second level of contact queue pool, and the third level of contact queue pool.

8. The one or more non-transitory computer-readable media of claim 1, wherein the acts further comprise:
   requesting subscription-related information associated with the user device from a customer database; and
   identifying the group based at least on the subscription-related information.

9. A computer-implemented method, comprising:
   receiving a request for customer support from a user device;
   identifying a group of a plurality of groups of agents available to serve the request, the group associated with a stack queue;
   routing the request to a first level of contact queue pool that includes the group;
   monitoring, in relation to the request, a wait time associated with the stack queue;
   upon detecting that the wait time associated with the stack queue has exceeded a predetermined threshold,
   identifying an additional group of agents available to serve the request in addition to the group of the plurality of groups of agents, wherein the group and the additional group of the plurality groups of agents are distinct from each other; and
   routing the request to a second level of contact queue pool that includes the additional group of agents.

10. The computer-implemented method of claim 9, further comprising:
    directing the request to a customer support terminal associated with a contact center agent.

11. The computer-implemented method of claim 9, further comprising:
    determining whether an additional wait time associated the stack queue at the second level of contact queue pool exceeds an additional predetermined threshold;
    if the additional wait time exceeds the additional predetermined threshold, identifying a universal group of agents available to serve the request, the universal group of agents comprising the additional group and the group of agents; and
    routing the request to a third level of contact queue pool that includes the universal group of agents.

12. The computer-implemented method of claim 11, wherein the request is associated with only the stack queue of a plurality of stack queues at the first level of contact queue pool, the second level of contact queue pool, and the third level of contact queue pool.

13. The computer-implemented method of claim 9, wherein the request specifies a service issue, and wherein identifying the group is based at least on the service issue associated with the user device.

14. The computer-implemented method of claim 10, further comprising:
    determining whether the contact center agent is associated with the group or the additional group of the plurality of groups of agents based at least on whether the contact center agent is associated with the stack queue;
    if the contact center agent is associated with the stack queue, associating the contact center agent with the group; and
    generating performance metrics associated with the group.

15. A system, comprising:
    one or more non-transitory storage mediums configured to provide stored computer-readable instructions, the one or more non-transitory storage mediums coupled to one or more processors, the one or more processors configured to execute the computer-readable instructions to cause the one or more processors to:
    receive a request for customer support from a user device, the request specifying a service issue associated with the user device;
    identify a group of a plurality of groups of agents available to serve the request, the group associated with a stack queue;
    route the request to a first level of contact queue pool that includes the group;
    monitor, in relation to the request, a wait time associated with the stack queue;
    upon detecting that the wait time associated with the stack queue has exceeded a predetermined threshold,
    identify an additional group of agents available to serve the request in addition to the group of the plurality of groups of agents, wherein the group and the additional group of the plurality groups of agents are distinct from each other; and
    route the request to a second level of contact queue pool that includes the additional group of agents.

16. The system of claim 15, wherein the one or more processor is further configured to:
    direct the request to a customer support terminal associated with a contact center agent to resolve the service issue.

17. The system of claim 16, wherein the one or more processors are configured to:
    determine whether the contact center agent is associated with the group or the additional group of the plurality of groups of agents based at least on whether the contact center agent is associated with the stack queue; and
    if the contact center agent is associated with the stack queue, associate the contact center agent with the group.

18. The system of claim 16, wherein the one or more processor is further configured to:
- determine whether the contact center agent is associated with the group or the additional group of the plurality of groups of agents based at least on whether the contact center agent is associated with an additional stack queue; and
- if the contact center agent is associated with the additional stack queue, associate the contact center agent with the additional group.

19. The system of claim 15, wherein the one or more processor is further configured to:
- determine whether an additional wait time associated the stack queue at the second level of contact queue pool exceeds an additional predetermined threshold;
- if the additional wait time exceeds the additional predetermined threshold, identify a universal group of agents available to serve the request, the universal group of agents comprising the additional group and the group of agents; and
- route the request to a third level of contact queue pool that includes the universal group of agents.

20. The system of claim 19, wherein the request is associated with only the stack queue of a plurality of stack queues at the first level of contact queue pool, the second level of contact queue pool, and the third level of contact queue pool.

* * * * *